United States Patent
Okamoto et al.

(10) Patent No.: US 7,904,281 B2
(45) Date of Patent: Mar. 8, 2011

(54) MOUNTING PROCESS SIMULATION SYSTEM AND METHOD THEREOF

(75) Inventors: Masaki Okamoto, Higashiosaka (JP); Hiroaki Fujiwara, Takatsuki (JP); Teppei Iwase, Neyagawa (JP)

(73) Assignee: Panasonic Corporation, Osaka (JP)

( * ) Notice: Subject to any disclaimer, the term of this patent is extended or adjusted under 35 U.S.C. 154(b) by 752 days.

(21) Appl. No.: 10/898,520

(22) Filed: Jul. 23, 2004

(65) Prior Publication Data

US 2005/0038641 A1 Feb. 17, 2005

(30) Foreign Application Priority Data

Aug. 7, 2003 (JP) ................................. 2003-289115

(51) Int. Cl.
*G06G 7/48* (2006.01)
(52) U.S. Cl. .............................. 703/6; 700/121; 438/428
(58) Field of Classification Search ...... 703/6; 700/121; 438/428
See application file for complete search history.

(56) References Cited

U.S. PATENT DOCUMENTS 7,171,897 B2 * 2/2007 Barajas et al. ................ 101/129

FOREIGN PATENT DOCUMENTS

| JP | 8-247918 A | 9/1996 |
|---|---|---|
| JP | 10-105594 A | 4/1998 |
| JP | 2002-232131 | 8/2002 |

OTHER PUBLICATIONS

Farhad Sarvar, Paul P. Conway; "Effective Modeling of the Reflow Soldering Process: Use of a Modeling Tool for Product and Process Design"; 1998; IEEE Transactions on Components, Packaging, and Manufacturing Technology; Part C, vol. 21, No. 3; pp. 165-171.*
Rajarshi Ray; "Placement of Surface Mount Components: Machine Accuracy and Performance Modeling"; 1995; IEEE; pp. 1746-1752.*
C. Bailey, D. Wheeler, M. Cross; "An Integrated MOdelling Approach to Solder Joint Formation"; 1998; IEEE; pp. 171-178.*
National Semiconductor; "Mounting of Surface Mount Components"; 2000; National Semiconductor; pp. 1-10.*
Thomas M. Tirpak, "Simulation Software for Surface Mount Assembly", 1993, IEEE, Proceedings of the 1993 Winter Simulation Conference, p. 796-803.*
David S. Moore et al., "Introduction to the Practice of Statistics", 1999, W.H. Freeman and Company, Third Edition, pp. 40-41.*

\* cited by examiner

*Primary Examiner* — Jason Proctor
(74) *Attorney, Agent, or Firm* — Pearne & Gordon LLP

(57) ABSTRACT

In a mounting process simulation system and a method thereof in accordance with the present invention, the respective simulations of a mounting process having a plurality of sequential steps are analyzed on the basis of condition parameters, a single evaluation value is created on the basis of the analysis results, and when the evaluation value does not reach a target value, an approximate function is created on the basis of the analysis results, a tentative parameter is created, and optimization is carried out again.

12 Claims, 11 Drawing Sheets

| CONDITION | KIND | EXPLANATION OF PARAMETER | CONTENT | REMARKS |
|---|---|---|---|---|
| MEMBER CONDITIONS | BOARD CONDITIONS | BOARD SIZE | 100×100×0.8 | x × y × z (mm) |
| | | LAND SIZE | 0.3×0.3 | x × y (mm) |
| | | MASK OPENING SHAPE | 0.3×0.3 | x × y (mm) |
| | SOLDER CONDITIONS | MASK THICKNESS | 0.11 | mm |
| | | SOLDER VISCOSITY | 190 | Pa·s |
| | | SOLDER MATERIAL | Sn/Ag/Cu | |
| | COMPONENT CONDITIONS | COMPONENT SIZE | 0.6×0.3×0.2 | x × y × z (mm) |
| | | COMPONENT WEIGHT | 0.01 | g |

(b)

| STEP | | EXPLANATION OF PARAMETER | UNIT | INITIAL PARAMETER | | | | | | |
|---|---|---|---|---|---|---|---|---|---|---|
| | | | | Xa1 | Xa2 | Xa3 | ... | Xa9 | Xa10 | |
| SOLDER PRINTING STEP | x1 | SQUEEGEE ANGLE | DEGREES | 60 | 45 | 75 | 55 | 50 | 51 | |
| | x2 | SQUEEGEE SPEED | mm/s | 30 | 60 | 40 | 50 | 60 | 65 | |
| | x3 | RELEASE SPEED | mm/s | 3.0 | 0.1 | 5.0 | 0.5 | 0.6 | 5.0 | |
| COMPONENT PLACEMENT STEP | x4 | PLACEMENT ACCELERATION | mm/s² | 10000 | 5000 | 2500 | 7500 | 5000 | 5200 | |
| | x5 | PUSHING AMOUNT | mm | 0.3 | 0.6 | 0.0 | 0.9 | 0.3 | 0.2 | |
| REFLOW STEP | x6 | PREHEATING ZONE TEMPERATURE | °C | 155 | 130 | 120 | 135 | 120 | 160 | |
| | x7 | MAIN HEATING ZONE TEMPERATURE | °C | 240 | 220 | 235 | 280 | 275 | 270 | |

FIG. 5

| STEP | | EXPLANATION OF PARAMETER | UNIT | INITIAL PARAMETER | | | | | |
|---|---|---|---|---|---|---|---|---|---|
| | | | | Xa1 | Xa2 | Xa3 | 13 | Xa9 | Xa10 |
| SOLDER PRINTING STEP | x1 | SQUEEGEE ANGLE | DEGREES | 60 | 45 | 75 | 55 | 50 | 51 |
| | x2 | SQUEEGEE SPEED | mm/s | 30 | 60 | 40 | 50 | 60 | 65 |
| | x3 | RELEASE SPEED | mm/s | 3.0 | 0.1 | 5.0 | 0.5 | 0.6 | 5.0 |
| COMPONENT PLACEMENT STEP | x4 | PLACEMENT ACCELERATION | mm/s² | 10000 | 5000 | 2500 | 7500 | 5000 | 5200 |
| | x5 | PUSHING AMOUNT | mm | 0.3 | 0.6 | 0.0 | 0.9 | 0.3 | 0.2 |
| REFLOW STEP | x6 | PREHEATING ZONE TEMPERATURE | °C | 155 | 130 | 120 | 135 | 120 | 160 |
| | x7 | MAIN HEATING ZONE TEMPERATURE | °C | 240 | 220 | 235 | 280 | 275 | 270 |
| Fp1 (X) | | SOLDER HEIGHT (AFTER PRINTING) | mm | 0.06 | 0.07 | 0.06 | 0.05 | 0.10 | 0.06 |
| Fp2 (X) | | SOLDER AREA (AFTER PRINTING) | mm² | 0.09 | 0.09 | 0.08 | 0.08 | 0.07 | 0.12 |
| Fp3 (X) | | SOLDER PRINTING DISLOCATION (AFTER PRINTING) | mm | 0.10 | 0.15 | 0.20 | 0.40 | 0.30 | 0.50 |
| Fp4 (X) | | COMPONENT PLACEMENT DISLOCATION | mm | 0.15 | 0.20 | 0.03 | 0.10 | 0.20 | 0.06 |
| Fp5 (X) | | SOLDER HEIGHT (AFTER PLACEMENT) | mm | 0.05 | 0.05 | 0.05 | 0.04 | 0.08 | 0.03 |
| Fp6 (X) | | SOLDER AREA (AFTER PLACEMENT) | mm² | 0.08 | 0.08 | 0.07 | 0.07 | 0.06 | 0.11 |
| Fp7 (X) | | SOLDER PRINTING DISLOCATION (AFTER PLACEMENT) | mm | 0.10 | 0.15 | 0.20 | 0.40 | 0.30 | 0.50 |
| Fq1 (X) | | SOLDER AREA | mm² | 0.08 | 0.08 | 0.07 | 0.06 | 0.06 | 0.11 |
| Fq2 (X) | | SOLDER TEMPERATURE | °C | 250 | 190 | 180 | 280 | 290 | 230 |
| Fq3 (X) | | FILLET HEIGHT | mm | 0.06 | 0.07 | 0.07 | 0.06 | 0.10 | 0.06 |
| Fq4 (X) | | COMPONENT MOUNTING DISLOCATION | mm | 0.04 | 0.10 | 0.03 | 0.07 | 0.08 | 0.05 |

FIG. 7

| PROCESS PERFORMANCE | EXPLANATION | UNIT | UPPER LIMIT VALUE Ui | LOWER LIMIT VALUE Li | IDEAL VALUE Oi | CONTRIBUTION DEGREE Wi |
|---|---|---|---|---|---|---|
| Eq 1 (X) | SOLDER AREA | mm$^2$ | 0.09 | 0.05 | 0.09 | 0.2 |
| Eq 2 (X) | SOLDER TEMPERATURE | °C | 250 | 180 | 210 | 0.1 |
| Eq 3 (X) | FILLET HEIGHT | mm | 0.20 | 0.05 | 0.15 | 0.5 |
| Eq 4 (X) | COMPONENT MUNTING DISLOCATION | mm | 0.20 | 0.00 | 0.00 | 0.2 |

| STEP | | EXPLANATION OF PARAMETER | UNIT | INITIAL PARAMETER | | | | Xa9 | Xa10 |
|---|---|---|---|---|---|---|---|---|---|
| | | | | Xa1 | Xa2 | Xa3 | 3 | | |
| SOLDER PRINTING STEP | x1 | SQUEEGEE ANGLE | DEGREE | 60 | 45 | 75 | 55 | 50 | 51 |
| | x2 | SQUEEGEE SPEED | mm/s | 30 | 60 | 40 | 50 | 60 | 65 |
| | x3 | RELEASE SPEED | mm/s | 3.0 | 0.1 | 5.0 | 5.5 | 0.6 | 5.0 |
| COMPONENT PLACEMENT STEP | x4 | PLACEMENT ACCELERATION | mm/s² | 10000 | 5000 | 2500 | 00 | 5000 | 5200 |
| | x5 | PUSHING AMOUNT | mm | 0.3 | 0.6 | 0.0 | 0.9 | 0.3 | 0.2 |
| REFLOW STEP | x6 | PREHEATING ZONE TEMPERATURE | °C | 155 | 130 | 120 | 35 | 120 | 160 |
| | x7 | MAIN HEATING ZONE TEMPERATURE | °C | 240 | 220 | 235 | 280 | 275 | 270 |
| Fp1 (X) | | SOLDER HEIGHT (AFTER PRINTING) | mm | 0.06 | 0.07 | 0.06 | 05 | 0.10 | 0.06 |
| Fp2 (X) | | SOLDER AREA (AFTER PRINTING) | mm² | 0.09 | 0.09 | 0.08 | 08 | 0.07 | 0.12 |
| Fp3 (X) | | SOLDER PRINTING DISLOCATION (AFTER PRINTING) | mm | 0.10 | 0.15 | 0.20 | 0.40 | 0.30 | 0.50 |
| Fp4 (X) | | COMPONENT PLACEMENT DISLOCATION | mm | 0.15 | 0.20 | 0.03 | 0.10 | 0.20 | 0.06 |
| Fp5 (X) | | SOLDER HEIGHT (AFTER PLACEMENT) | mm | 0.05 | 0.05 | 0.0 | 0.04 | 0.08 | 0.03 |
| Fp6 (X) | | SOLDER AREA (AFTER PLACEMENT) | mm² | 0.08 | 0.08 | 0.0 | 0.07 | 0.06 | 0.11 |
| Fp7 (X) | | SOLDER PRINTING DISLOCATION (AFTER PLACEMENT) | mm | 0.10 | 0.15 | 0.2 | 0.40 | 0.30 | 0.50 |
| Fq1 (X) | | SOLDER AREA | mm² | 0.08 | 0.08 | 0 | 0.06 | 0.06 | 0.11 |
| Fq2 (X) | | SOLDER TEMPERATURE | °C | 250 | 190 | 0 | 280 | 290 | 230 |
| Fq3 (X) | | FILLET HEIGHT | mm | 0.06 | 0.07 | 0 | 0.06 | 0.10 | 0.06 |
| Fq4 (X) | | COMPONENT MOUNTING DISLOCATION | mm | 0.04 | 0.10 | 0 | 0.07 | 0.08 | 0.05 |
| Q1 (X) | | SOLDER AREA (NORMALIZED) | | 0.050 | 0.050 | 0.100 | 0.150 | 0.150 | 0.100 |
| Q2 (X) | | SOLDER TEMPERATURE (NORMALIZED) | | 0.057 | 0.029 | 0.043 | 0.100 | 0.114 | 0.029 |
| Q3 (X) | | FILLET HEIGHT (NORMALIZED) | | 0.450 | 0.400 | 0.400 | 0.475 | 0.250 | 0.450 |
| Q4 (X) | | COMPONENT MOUNTING DISLOCATION (NORMALIZED) | | 0.040 | 0.100 | 0.030 | 070 | 0.080 | 0.045 |
| Q (X) | | COMMON PROCESS PERFORMANCE | | 0.597 | 0.579 | 0.573 | 95 | 0.594 | 0.624 |

FIG. 8

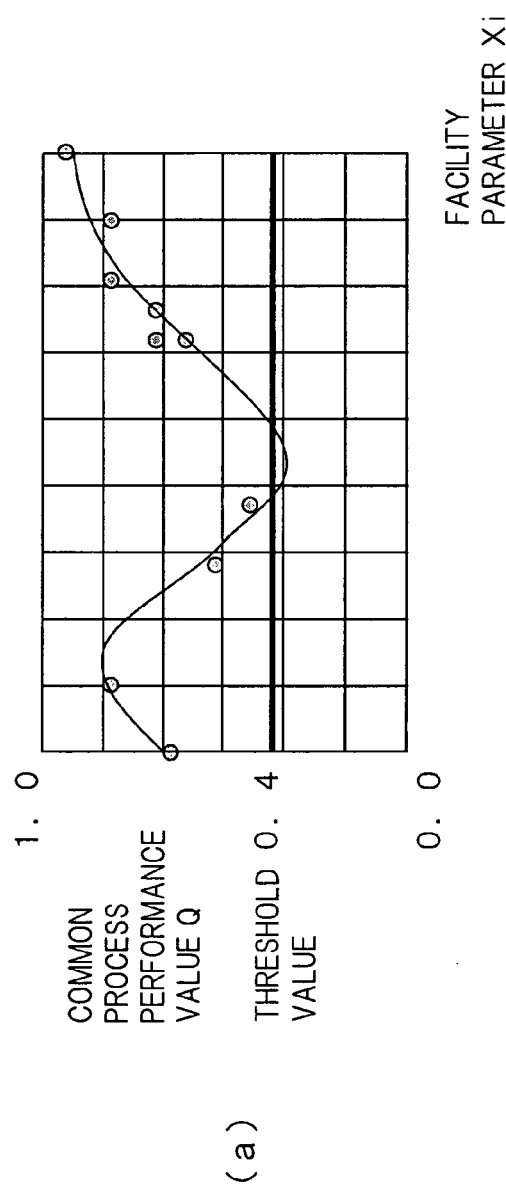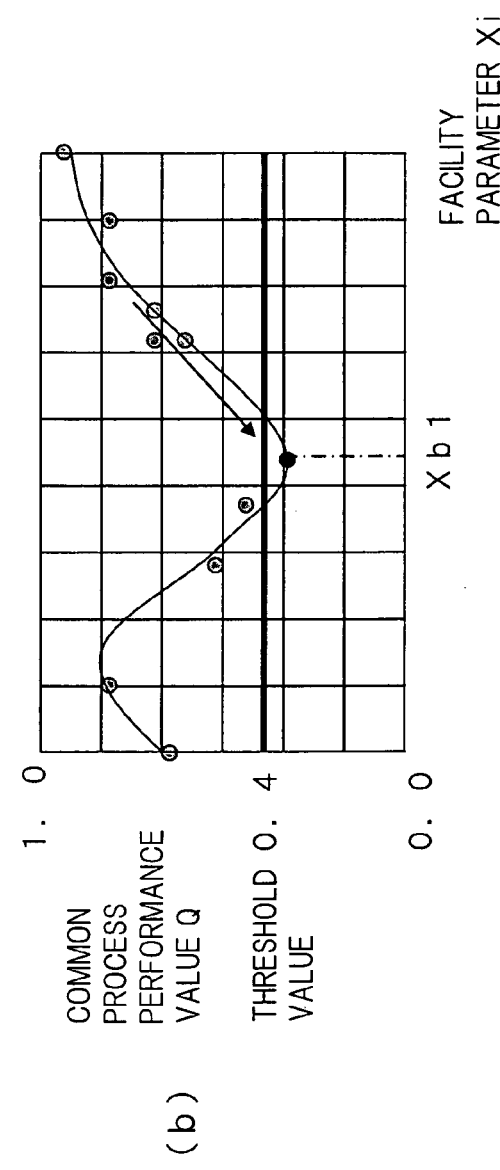
FIG. 9

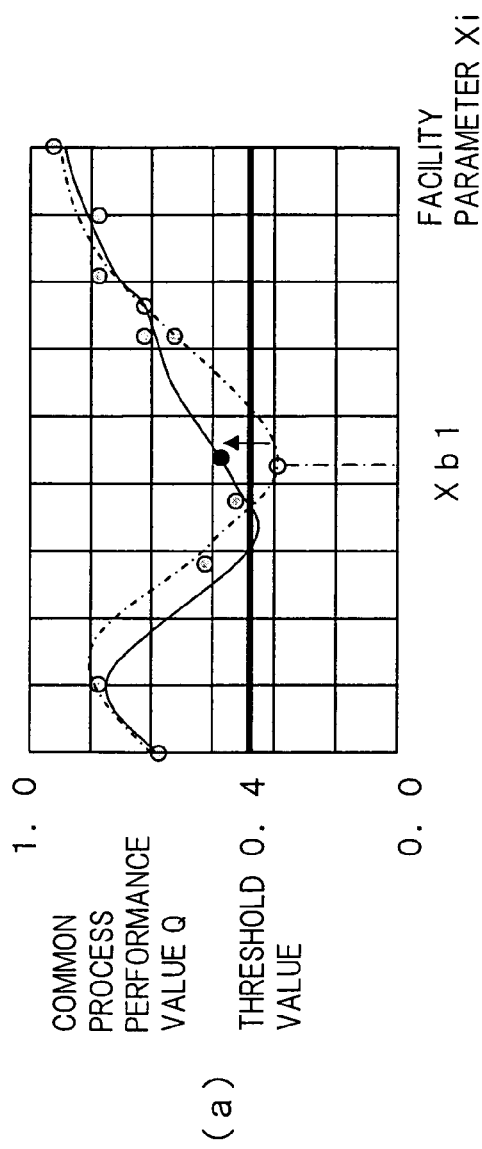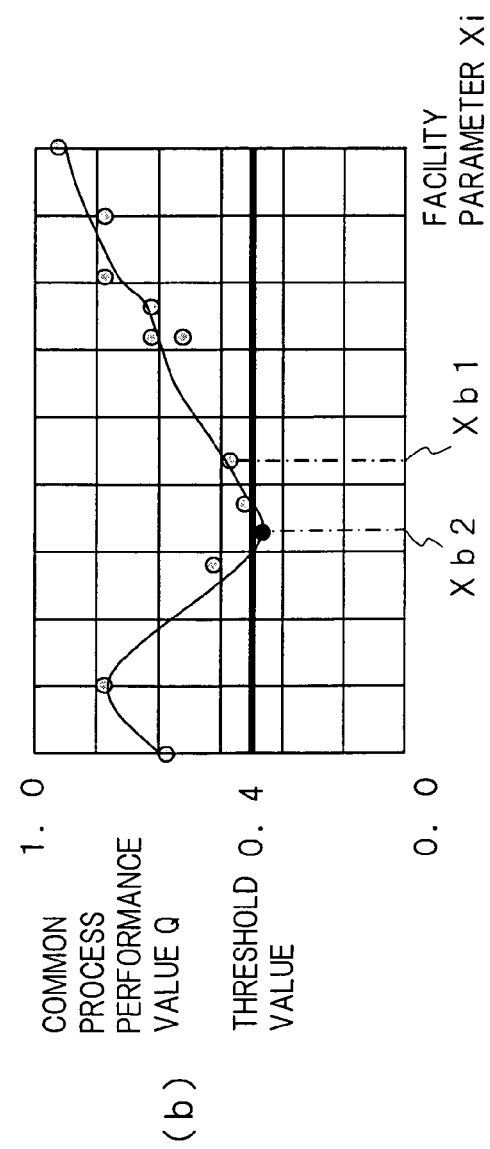
FIG. 10

FIG. 11

| STEP | | EXPLANATION OF PARAMETER | UNIT | INITIAL PARAMETER | | | ... | TENTATIVE PARAMETER | | | ... | | |
|---|---|---|---|---|---|---|---|---|---|---|---|---|---|
| | | | | Xa1 | Xa2 | Xa3 | Xa9 | Xa10 | Xb1 | Xb2 | Xb3 | Xb9 | Xb10 |
| SOLDER PRINTING STEP | x1 | SQUEEGEE ANGLE | DEGREE | 60 | 45 | 75 | 50 | 51 | 70 | 65 | 60 | 60 | 60 |
| | x2 | SQUEEGEE SPEED | mm/s | 30 | 60 | 40 | 60 | 65 | 42 | 42 | 42 | 43 | 43 |
| | x3 | RELEASE SPEED | mm/s | 3.0 | 0.1 | 5.0 | 0.6 | 5.0 | 5.0 | 5.0 | 5.0 | 4.5 | 4.5 |
| COMPONENT PLACEMENT STEP | x4 | PLACEMENT ACCELERATION | mm/s² | 10000 | 5000 | 2500 | 5000 | 5200 | 4000 | 4500 | 4500 | 4200 | 4200 |
| | x5 | PUSHING AMOUNT | mm | 0.3 | 0.6 | 0.0 | 0.3 | 0.2 | 0.1 | 0.1 | 0.1 | 0.2 | 0.1 |
| REFLOW STEP | x6 | PREHEATING ZONE TEMPERATURE | °C | 155 | 130 | 120 | 120 | 160 | 120 | 130 | 125 | 125 | 125 |
| | x7 | MAIN HEATING ZONE TEMPERATURE | °C | 240 | 220 | 235 | 275 | 270 | 235 | 235 | 238 | 140 | 140 |
| Fp1 (X) | | SOLDER HEIGHT (AFTER PRINTING) | mm | 0.06 | 0.07 | 0.06 | 0.10 | 0.06 | 0.07 | 0.06 | 0.06 | 0.08 | 0.08 |
| Fp2 (X) | | SOLDER AREA (AFTER PRINTING) | mm² | 0.09 | 0.09 | 0.08 | 0.07 | 0.12 | 0.08 | 0.09 | 0.08 | 0.08 | 0.08 |
| Fp3 (X) | | SOLDER PRINTING DISLOCATION (AFTER PRINTING) | mm | 0.10 | 0.15 | 0.20 | 0.30 | 0.50 | 0.19 | 0.15 | 0.15 | 0.08 | 0.08 |
| Fp4 (X) | | COMPONENT PLACEMENT DISLOCATION | mm | 0.15 | 0.20 | 0.03 | 0.20 | 0.06 | 0.03 | 0.02 | 0.02 | 0.02 | 0.02 |
| Fp5 (X) | | SOLDER HEIGHT (AFTER PLACEMENT) | mm | 0.05 | 0.05 | 0.05 | 0.08 | 0.03 | 0.05 | 0.05 | 0.05 | 0.07 | 0.07 |
| Fp6 (X) | | SOLDER AREA (AFTER PLACEMENT) | | 0.08 | 0.08 | 0.07 | 0.06 | 0.11 | 0.07 | 0.08 | 0.08 | 0.08 | 0.08 |
| Fp7 (X) | | SOLDER PRINTING DISLOCATION (AFTER PLACEMENT) | mm | 0.10 | 0.15 | 0.20 | 0.30 | 0.50 | 0.19 | 0.15 | 0.15 | 0.08 | 0.08 |
| Fq1 (X) | | SOLDER AREA | mm² | 0.08 | 0.08 | 0.07 | 0.06 | 0.11 | 0.07 | 0.08 | 0.08 | 0.08 | 0.08 |
| Fq2 (X) | | SOLDER TEMPERATURE | °C | 250 | 190 | 180 | 290 | 230 | 185 | 185 | 200 | 200 | 210 |
| Fq3 (X) | | FILLET HEIGHT | mm | 0.06 | 0.07 | 0.07 | 0.10 | 0.06 | 0.08 | 0.08 | 0.08 | 0.08 | 0.09 |
| Fq4 (X) | | COMPONENT MOUNTING DISLOCATION | mm | 0.04 | 0.10 | 0.03 | 0.08 | 0.05 | 0.04 | 0.03 | 0.02 | 0.02 | 0.02 |
| Q1 (X) | | SOLDER AREA (NORMALIZED) | | 0.050 | 0.050 | 0.100 | 0.150 | 0.100 | 0.100 | 0.050 | 0.075 | 0.050 | 0.050 |
| Q2 (X) | | SOLDER TEMPERATURE (NORMALIZED) | | 0.057 | 0.029 | 0.043 | 0.114 | 0.029 | 0.036 | 0.036 | 0.014 | 0.014 | 0.000 |
| Q3 (X) | | FILLET HEIGHT (NORMALIZED) | | 0.450 | 0.400 | 0.400 | 0.250 | 0.450 | 0.350 | 0.350 | 0.350 | 0.350 | 0.325 |
| Q4 (X) | | COMPONENT MOUNTING DISLOCATION (NORMALIZED) | | 0.040 | 0.100 | 0.030 | 0.080 | 0.045 | 0.040 | 0.030 | 0.020 | 0.020 | 0.020 |
| Q (X) | | COMMON PROCESS PERFORMANCE | | 0.597 | 0.579 | 0.573 | 0.594 | 0.624 | 0.526 | 0.466 | 0.459 | 0.434 | 0.395 |

MOUNTING PROCESS SIMULATION SYSTEM AND METHOD THEREOF

BACKGROUND OF THE INVENTION

The present invention relates to a mounting process simulation system for carrying out simulations of a mounting process comprising a plurality of steps by using a computer and a method thereof, and more particularly, to a mounting process simulation system for sequentially simulating a plurality of steps and a method thereof.

Conventionally, as a method for determining the conditions of a mounting process for mounting various electronic components on a circuit board, a simulation was carried out using a CAE (Computer Aided Engineering) tool at each step, or production was carried out experimentally on conditions similar to actual mounting conditions. This kind of method for determining the conditions of the mounting process is carried out in reflow soldering processing, for example. The reflow soldering processing includes a solder printing step, a component placement step and a reflow step. At the solder printing step, on a circuit board on which predetermined circuit patterns are formed, solder is printed onto the electrode portions of the circuit patterns so as to be electrically connected to components serving as electronic components to be mounted on this circuit board. At the component placement step, components to be mounted on the printed solder are placed. At the reflow step, the printed solder is heated and melted, whereby the electrodes of the components are electrically connected to the circuit patterns, and the components are firmly fixed at desired positions on the circuit board. These solder printing step, component placement step and reflow step are carried out sequentially in general reflow soldering processing.

To evaluate this kind of mounting process, simulation systems for analyzing and evaluating failure phenomena of mounted products have been proposed. For example, in Japanese Unexamined Patent Publication No. 2002-232131, a thermal analysis apparatus and a heating condition calculation apparatus are described wherein in order to determine heating conditions to be given to a heating apparatus in reflow soldering processing, heating conditions are derived by introducing the geometric factors of substances to be heated.

In the case when process conditions are determined for mounted products, it is necessary to carry out a simulation at each step of the mounting process. A plurality of simulations were required, for example, the analysis of a soldering state at a solder printing step; the analysis of a component placement state at a component placement step; and the analysis of behavior, the positional analysis of electronic components with respect to a circuit board, the reliability evaluation of the circuit board, etc. at the final step. In other words, in the case when n (n: any natural number) steps that were required to be simulated in the mounting process were present, users had to carry out at least n simulations.

In the conventional simulation system, when condition parameters best suited for the mounting step were set, such a method as typified by Taguchi Method was used to reduce the time required for a simulation. Taguchi Method is a method wherein predetermined initial parameters are prepared in advance and a simulation is carried out on the basis of the initial parameters. In Taguchi Method, an approximate model is created by using the results obtained by the simulation, and optimum parameters are searched for, whereby condition parameters are determined.

However, in the case when a simulation is carried out by using Taguchi Method, the user is required to determine appropriate initial parameters in advance. Furthermore, after the simulation, the user must determine condition parameters depending on calculated data.

In this kind of method wherein a simulation is carried out by using initial parameters determined in advance and an approximate model is created, since the sample number of initial parameters to be determined in advance is unknown, numerous initial parameters are determined; as a result, too many simulations are required to be carried out. In addition, since the user cannot accurately judge whether the obtained analysis results are optimal or not, there is a possibility that the user might select improper condition parameters.

Furthermore, for the evaluation of the entire mounting process, it was necessary to evaluate the analysis results of a plurality of simulations at the same time. For example, for the comprehensive evaluation of the performance of the entire process using the respective analysis results of the solder printing step, the component placement step and the reflow step in the mounting process, the user himself had to make comprehensive judgments on the basis of the results of the plurality of simulations.

BRIEF SUMMARY OF THE INVENTION

The present invention is intended to provide a mounting process simulation system capable of providing a single evaluation standard capable of carrying out comprehensive evaluation in the simulations of a mounting process comprising a plurality of steps, and a method thereof.

In order to attain the above-mentioned object, the mounting process simulation system in accordance with the present invention comprises:

a condition setting section for setting condition parameters for mounting process simulations, an analysis section for carrying out the respective simulations of the mounting process having a plurality of sequential steps on the basis of the above-mentioned condition parameters and for storing and outputting the plurality of analysis results of the respective simulations, an evaluation processing section for creating a single evaluation value on the basis of the plurality of analysis results from the above-mentioned analysis section and for comparing the evaluation value with a preset target value, and an optimizing section for creating an approximate function on the basis of the above-mentioned analysis results from the above-mentioned evaluation processing section at the time when the evaluation value does not reach the target value in the above-mentioned evaluation processing section, for searching for a tentative parameter and for outputting the tentative parameter to the above-mentioned condition setting section as condition parameters.

In the mounting process simulation system in accordance with the present invention configured as described above, by sequentially carrying out the respective simulations, condition parameters for optimizing the mounting process performance of each step in the mounting process or the mounting process performance of the entire mounting process can be obtained.

The mounting process simulation method in accordance with the present invention comprises:

a step of setting condition parameters for mounting process simulations, a step of carrying out the respective simulations of a mounting process having a plurality of sequential steps on the basis of the above-mentioned condition parameters and for outputting the plurality of analysis results of the respective simulations, a step of creating a single evaluation value on the basis of the above-mentioned plurality of analysis results and for comparing the evaluation value with a preset target value, a step of creating an approximate function on the basis of the above-mentioned analysis results at the time when the above-mentioned evaluation value does not reach the target value, a step of searching for a tentative parameter on the basis of the above-mentioned approximate function and for setting the tentative parameter as condition parameters, and a step of stopping the above-mentioned mounting process simulations at the time when the above-mentioned evaluation value reaches the target value.

With the mounting process simulation method in accordance with the present invention configured as described above, by sequentially carrying out the respective simulations, condition parameters for optimizing the mounting process performance of each step in the mounting process or the mounting process performance of the entire process can be obtained.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 4 is a table showing data to be processed by the member condition DB 11 and the facility parameter setting section 12 of a condition setting section 1 in accordance with the first embodiment; part (a) thereof is a table showing data to be stored in the member condition DB 11, and part (b) thereof is a table specifically showing the kinds of facility parameters to be set in the facility parameter setting section 12;

FIG. 5 is a table specifically showing initial parameters set in the condition setting section 1 in accordance with the first embodiment;

FIG. 7 is a table specifically showing an example of data to be stored in the experiment result DB 32 in an evaluation processing section 3 in accordance with the first embodiment;

FIG. 8 is a table showing specific examples of normalized process performance values $Q_i(X)$;

FIG. 9 is a graph explaining a method for creating a first approximate function and a method for obtaining the minimum value from the approximate function in accordance with the first embodiment;

FIG. 10 is a graph explaining a method for creating a second approximate function and a method for obtaining the minimum value from the approximate function in accordance with the first embodiment;

FIG. 11 is a table describing specific numeric values obtained in the mounting process simulation system in accordance with the first embodiment.

It will be recognized that some or all of the figures are schematic representations for purposes of illustration and do not necessarily depict the actual relative sizes or locations of the elements shown.

DETAILED DESCRIPTION OF THE INVENTION

Preferred embodiments indicating a mounting process simulation system and a method thereof in accordance with the present invention will be described below referring to the accompanying drawings.

First Embodiment

In a first embodiment, a mounting process simulation system for reflow soldering processing will be described as an example of a mounting process having a plurality of steps. The reflow soldering processing has a solder printing step for printing solder on a circuit board, a component placement step for placing components serving as electronic components on the circuit board, and a reflow step for heating, melting and cooling the solder. At the solder printing step, on a circuit board on which predetermined circuit patterns are formed, solder is printed onto the electrode portions of the circuit patterns so as to be electrically connected to components to be mounted on this circuit board. At the component placement step, components to be mounted on the printed solder are placed. At the reflow step, the printed solder is heated and melted, whereby the electrodes of the components are electrically connected to the circuit patterns, and the components are firmly fixed at desired positions on the circuit board. In the reflow soldering processing, the solder printing step, the component placement step and the reflow step are carried out sequentially.

Figure 1:
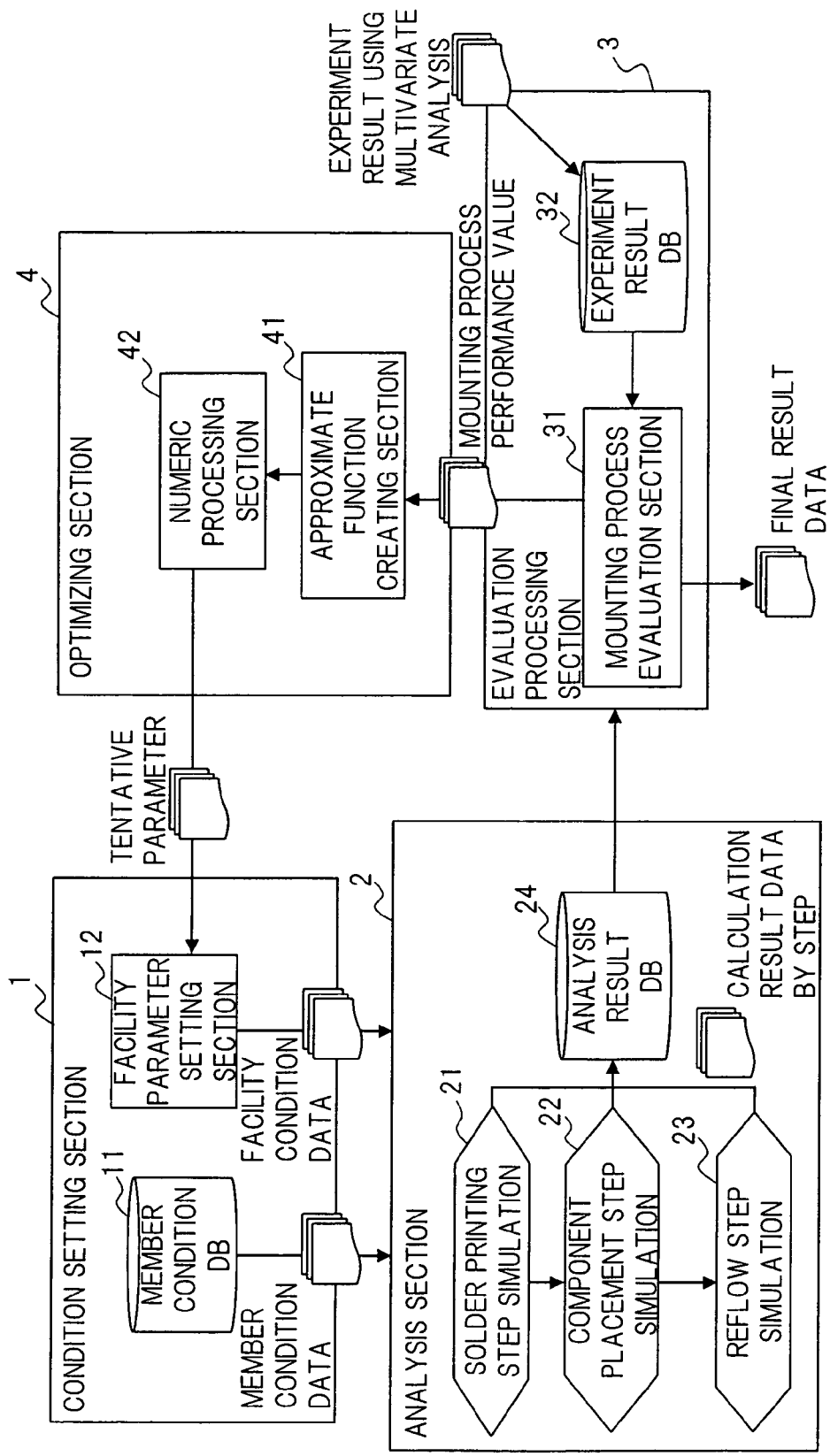
FIG. 1 is a block diagram showing the configuration of a mounting process simulation system in accordance with a first embodiment of the present invention.

FIG. 1 is a block diagram showing the configuration of the mounting process simulation system in accordance with the first embodiment. Referring to the block diagram shown in FIG. 1, the configuration of the mounting process simulation system in accordance with the first embodiment will be described.

The mounting process simulation system in accordance with the first embodiment comprises a condition setting section 1, an analysis section 2, an evaluation processing section 3 and an optimizing section 4.

The condition setting section 1, in which condition parameters for analysis are set, includes a member condition database (hereafter simply referred to as a member condition DB) 11 and a facility parameter setting section 12. The member condition DB 11 stores data regarding members, such as circuit boards, electronic components to be mounted and solder, for example, data, such as shapes and materials. In the facility parameter setting section 12, operation parameters and the like regarding respective facilities in the mounting process simulation system can be set. As described above, in the condition setting section 1, the member condition DB 11 is a fixed condition parameter storage section for storing the condition parameters having fixed values, and the facility parameter setting section 12 is an operation condition parameter setting section for setting the operation parameters having variable values. The parameters to be stored in the member condition DB 11 are herein all assumed to be fixed parameters; however, in the case when the parameters are variable depending on the determination of process conditions, such as mask opening shape, mask thickness and solder viscosity, it is conceivable that they are stored in the facility parameter setting section as operation condition parameters.

The analysis section 2 analyzes respective steps, stores the analysis results of the respective steps in an analysis result database (hereafter simply referred to as an analysis result DB) 24 serving as an analysis result storage section and outputs the results to the evaluation processing section 3. In other words, in the analysis section 2, mounting process simulations at the respective steps are carried out, and various mounting process performance values calculated finally are sent out to the evaluation processing section 3. The mounting process simulations carried out in the analysis section 2 are a solder printing step simulation 21, a component placement step simulation 22 and a reflow step simulation 23. In the solder printing step simulation 21, the flowing state of solder at the solder printing step is analyzed, and solder height, solder area, solder printing dislocation, etc. are calculated. In the component placement step simulation 22, solder shapes deformed by mounted electronic components are analyzed; electronic component placement dislocation, solder height, solder area, solder printing dislocation, etc. after electronic components are placed are calculated. Furthermore, in the reflow step simulation 23, thermal conduction by placed solder and the melting state of solder are analyzed; solder temperature, solder area, fillet height, component mounting dislocation, etc. are calculated. Fillet height is defined as, after the placement of a component on a circuit board, the height of solder melted and attached to a side face of the component from the face of the circuit board. As described above, the respective values calculated in the reflow step simulation 23, such as solder temperature, solder area, fillet height and component mounting dislocation, are data indicating the performance of the mounting process; the data indicating the performance of the mounting process is stored in the analysis result DB 24 and output to the evaluation processing section 3.

On the basis of mounting process performance values indicating solder temperature, solder area, fillet height and component mounting dislocation, etc. finally calculated by the respective simulations carried out in the analysis section 2, the evaluation processing section 3 calculates common process performance indicating a comprehensive mounting process performance value for the reflow soldering processing carried out at the time. The evaluation processing section 3 comprises a mounting process evaluation section 31 and an experiment result database (hereafter simply referred to as an experiment result DB) 32 (see FIG. 1). The experiment result DB 32 is herein an experiment result storage section. The mounting process evaluation section 31 weights and normalizes the respective mounting process performance values and calculates a common process performance value. Data required for weighting and normalizing the performance of the respective mounting steps is obtained by experiment and stored in the experiment result DB 32.

In the evaluation processing section 3, a judgment as to whether the calculated common process performance value is smaller than a predetermined threshold value or not. If the common process performance value is smaller than the threshold value, the facility parameters at the time are assumed to be optimal, and the mounting process simulations end. On the other hand, in the case when the common process performance value has not yet reached the threshold value, the facility parameters, the common process performance value, etc., serving as analysis result data obtained so far, are sent out to the optimizing section 4.

On the basis of the common process performance value calculated in the evaluation processing section 3 and the facility parameters, the optimizing section 4 estimates and calculates a tentative parameter judged to be more proper and outputs the tentative parameter to the condition setting section 1. The optimizing section 4 comprises an approximate function creating section 41 and a numeric processing section 42 (see FIG. 1). In the approximate function creating section 41, a plurality of common process performance values calculated from the combination of the facility parameters in the evaluation processing section 3 are plotted, and an approximate function is created. The numeric processing section 42 searches for the combination of the facility parameters wherein the value becomes the smallest in the approximate function. As a search method being used herein, SQP (Sequential Quadratic Programming) was used as a general optimizing method. As other search methods, GA (Genetic Algorithms), SA (Simulated Annealing), etc. can also be used.

The optimizing section 4 outputs the combination of facility parameters wherein the common process performance value is expected to become the smallest to the condition setting section 1 as a tentative parameter. In the condition setting section 1, the new combination of facility parameters are newly set as facility parameters in the facility parameter setting section 12 and sent to the analysis section 2. In the analysis section 2, the solder printing step, the component placement step and the reflow step described above are simulated, and the results of the analysis are stored in the analysis result DB 24 and input to the evaluation processing section 3. In the evaluation processing section 3, a common process performance value regarding the new analysis results is calculated, and a judgment is made as to whether the common process performance value is smaller than the threshold value or not. If the common process performance value is smaller than the threshold value, the combination of the facility parameters at the time is assumed to be optimal, and the mounting process simulations end.

On the other hand, in the case when the common process performance value has not yet reached the threshold value, a new approximate function is created again on the basis of all the common process performance values including the new common process performance value. Furthermore, the combination of facility parameters wherein the value becomes the smallest in the approximate function is searched for, and the combination of the facility parameters is output as a tentative parameter to the condition setting section 1. As described above, a common process performance value is calculated, and an approximate function is created on the basis of the common process performance value, whereby a tentative parameter is obtained. As described above, the tentative parameter is obtained, a common process performance value regarding the new analysis results is calculated, and the judgment as to whether the common process performance value is smaller than the threshold value or not is made. This routine continues until the common process performance value becomes smaller than the threshold value; when the common process performance value becomes smaller than the threshold value, the combination of the facility parameters at the time is assumed to be optimal, and the mounting process simulations end.

[Operation of the Mounting Process Simulation System]

Figure 2:
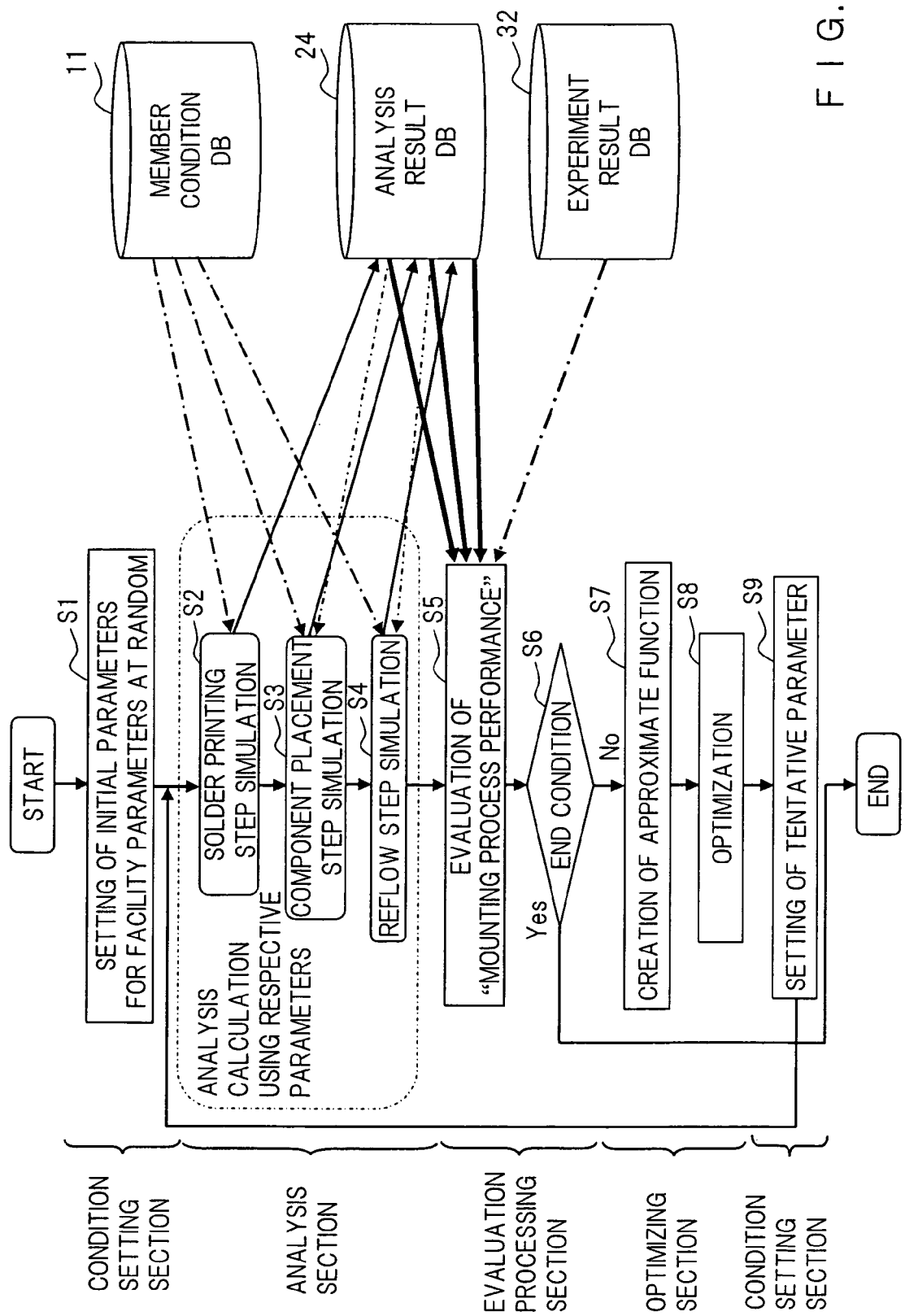
FIG. 2 is a flowchart showing mounting process simulations in accordance with the first embodiment.
Figure 3:
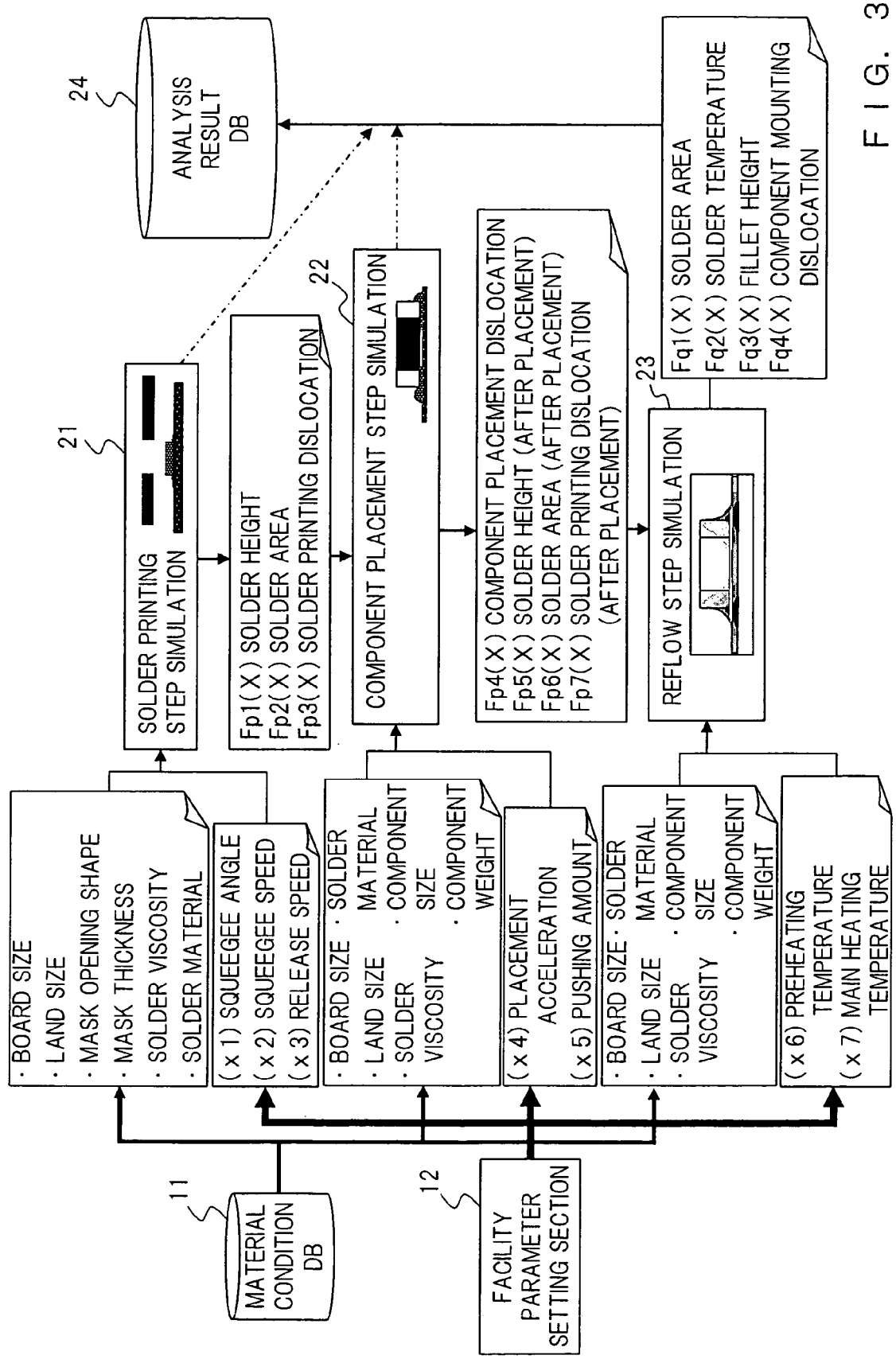
FIG. 3 is a view showing the flow of data at step S2 to step S4 in the mounting process simulations in accordance with the first embodiment.

FIG. 2 is a flowchart showing mounting process simulations in the mounting process simulation system in accordance with the first embodiment. FIG. 3 is a view showing the flow of data in respective simulations at step S2 to step S4 in the mounting process simulations in accordance with the first embodiment shown in FIG. 2.

The entire flow with respect to the mounting process simulations in accordance with the first embodiment will be described below using the flowchart shown in FIG. 2.

In the mounting process simulation system in accordance with the first embodiment, the facility parameter setting section 12 of the condition setting section 1 determines a plurality of initial parameters (facility parameters, such as squeegee angle, squeegee speed, release speed, placement acceleration, pushing amount, preheating zone temperature and main heating zone temperature) at random from numeric values within predetermined ranges and sets the combination thereof (at step S1 of FIG. 2).

At step S2, the solder printing step simulation 21 in accordance with the combination of the initial parameters from the facility parameter setting section 12 is carried out. The solder printing step simulation 21 analyzes the state of solder filling into a mask by using flow analysis. As shown in FIG. 3, the facility parameters for use in the solder printing step simulation 21 are, for example, squeegee angle, squeegee speed and release speed. In addition, in the solder printing step simulation, member condition data (data, such as board size, land size, mask opening shape, mask thickness, solder viscosity, solder material) is input from the member condition DB 11 and used.

At step S3, the data of the analysis results obtained by the solder printing step simulation 21 (data, such as solder height, solder area and solder printing dislocation) is received, and the component placement step simulation 22 is carried out. The component placement step simulation 22 analyzes the deformation state of solder during component movement by using flow analysis. Facility parameters for use in this component placement step simulation 22 are, for example, placement acceleration, pushing amount, etc. In the component placement step simulation 22, member condition data (data, such as, board size, land size, solder viscosity, solder material, component size and component weight) is input from the member condition DB 11.

At step S4, the data of the analysis results obtained by the component placement step simulation 22 (data, such as component placement dislocation, and solder height, solder area and solder printing dislocation after placement) is received, and the reflow step simulation 23 is carried out. The reflow step simulation 23 analyzes the wetting state of solder and the change in temperature by using thermal flow analysis. Facility parameters for use in this reflow step simulation 23 are, for example, preheating temperature, main heating temperature, etc. In the reflow step simulation 23, member condition data (data, such as board size, land size, solder viscosity, solder material, component size and component weight) is input from the member condition DB 11.

As shown in FIG. 3, the data of the analysis results obtained by the reflow step simulation 23 (data, such as solder area, solder temperature, fillet height and component mounting dislocation) is stored as values indicating mounting process performance in the analysis result DB 24. However, the analysis result DB 24 may be configured so as to store the analysis results obtained by the solder printing step simulation 21 and the component placement step simulation 22. For example, in the component placement step simulation 22, impact loads to components, etc. can be obtained in the component placement step simulation 22 as analysis results and can be stored in the analysis result DB 24.

In the mounting step simulation in accordance with the first embodiment, four items: solder area, solder temperature, fillet height and component placement dislocation, are used as mounting process performance values; however, in the present invention, the mounting process performance values are not limited to only these items; for example, impact loads to components, etc. obtained as the analysis results of the mounting step simulation may also be additionally included in the mounting process performance values.

As described above, when the data of the analysis results obtained by the reflow step simulation 23 is stored as mounting process performance values in the analysis result DB 24, the mounting process performance values are calculated and evaluated in the evaluation processing section 3 (step S5 of FIG. 2). Experiment result data from the experiment result DB 32 is also used for the evaluation in the evaluation processing section 3. A common process performance value calculated at this time is compared with the threshold value; if it is a threshold value or less, this mounting process simulation ends (see step S6 of FIG. 2).

At step S6 of FIG. 2, if any common process performance values in the combination of facility parameters have not yet reached the threshold value, an approximate function is created by the response surface method from the calculated common process performance value as described above (at step S7). In the created approximate function, a value wherein the common process performance value becomes the smallest is estimated (at step S8), and from the minimum value, the combination of facility parameters is set as a tentative parameter (at step S9). The tentative parameter having been set as described above is input to the condition setting section 1, and a new combination of facility parameters is set. On the basis of the facility parameters having been set as described above, the solder printing step simulation 21, the component placement step simulation 22 and the reflow step simulation 23 described above are carried out, and a common process performance value regarding the new analysis results is calculated. If the common process performance value is smaller than the threshold value, the combination of the facility parameters at the time is assumed to be optimal, and the mounting process simulations end. As described above, an approximate function is created on the basis of the common process performance values calculated so far until the common process performance value becomes the threshold value or less, and the respective simulations are carried out by using the tentative parameter.

In the first embodiment, the number of routines (for example, 100) for calculating new common process performance values has been set in advance; in the case when the common process performance value does not become the threshold value or less even if the number is reached, the mounting process simulations are completed forcibly.

[Respective Configurations of Mounting Process Simulations]

A specific example of each configuration portion in the mounting process simulation system in accordance with the first embodiment configured as described above will be described next.

[Condition Setting Section]

FIG. 4 specifically shows data to be processed by the member condition DB 11 and the facility parameter setting section 12 in the condition setting section 1. Part (a) of FIG. 4 is a table showing data to be stored in the member condition DB 11. Part (b) of FIG. 4 is a table specifically showing the kinds of facility parameters to be set in the facility parameter setting section 12.

As shown in part (a) of FIG. 4, circuit board conditions, solder conditions and component conditions are available as the types of data to be stored in the member condition DB 11, and these conditions are fixed values preset in the mounting process simulation in accordance with the first embodiment.

Specific examples of circuit board conditions are board size: 100 (length)×100 (width)×0.8 (thickness) [mm] and land size: 0.3 (length)×0.3 (thickness) [mm]. Solder conditions are mask opening shape: 0.3 (length)×0.3 (width) [mm], mask thickness: 0.11 [m], solder viscosity: 190 [Pa·s] and solder material: Sn/Ag/Cu. Component conditions are component size: 0.6 (length)×0.3 (width)×0.2 (thickness) [mm] and component weight: 0.01 [g].

As shown in part (b) of FIG. 4, facility parameters to be set in the facility parameter setting section 12 are squeegee angle (x1), squeegee speed (x2) and release speed (x3) at the solder printing step, placement acceleration (x4) and pushing amount (x5) at the component placement step, and preheating zone temperature (x6) and main heating zone temperature (x7) at the reflow step.

The squeegee in the above-mentioned facility parameters is a member for forcing solder to flow through a mask and made of a polyurethane resin. The angle of this squeegee with respect to the face of the mask when the squeegee moves is the squeegee angle, and the speed of the squeegee at the time is the squeegee speed. The release speed is the speed of the mask at the time when the mask is raised and released from solder after solder filling. The placement acceleration is the acceleration of a component being moved toward a circuit board at the time when the component is placed onto the circuit board. The pushing amount is the amount by which a component is inserted in a circuit board at the time when the component is pushed to the circuit board. The preheating zone temperature is a temperature at which solder is preheated. The main heating temperature is a temperature at which solder is melted.

By setting other facility parameters, such as squeegee pushing amount at the solder printing step, placement timing and placement pressure at the component placement step and circuit board transfer speed at the reflow step, although these are not objects to be set in the first embodiment, a mounting process simulation system having higher accuracy can be constructed.

In the facility parameter setting section 12, the setting method for the facility parameters (x1 to x7) in respective initial parameter combinations (Xa1 to Xa10) is selected at random from within the range of the upper limit value to the lower limit value of a facility parameter to be determined by a facility. For example, in the case when the initial parameter (xa1) of the squeegee angle (x1) at the solder printing step is set, since the lower limit value of the squeegee angle (x1) is 45 degrees and the upper limit value thereof is 75 degrees, the initial parameter is selected at random from within the range. In other words, the initial parameter (xa1) of the squeegee angle (x1) is set by the following equation (1).

$$(X1)=(\text{any number from } 0.1 \text{ to } 1.0)\times(75-45)+45 \quad (1)$$

In the first embodiment, the setting number of initial parameters, each being a combination of respective facility parameters, is 10 (Xa1 to Xa10).

[Analysis Section]

Next, a specific example of the analysis section 2 in the mounting process simulation system in accordance with the first embodiment will be described. FIG. 5 is a table specifically showing initial parameter combinations (Xa1 to Xa10) set in the condition setting section 1 and also showing the analysis results of respective simulations carried out by using the initial parameters. In FIG. 5, the analysis results Fp1(X) to Fp3(X) are calculated in the solder printing step simulation 21 and used in the next step, the component placement step simulation 22. Then, the analysis results Fp4(X) to Fp7(X) are calculated in the component placement step simulation 22 and used in the next step, the reflow step simulation 23.

The analysis results Fq1(X) to Fq4(X) calculated in the reflow step simulation 23 are stored as mounting process performance values in the analysis result DB 24 and sent out to the evaluation processing section 3.

Figure 6:
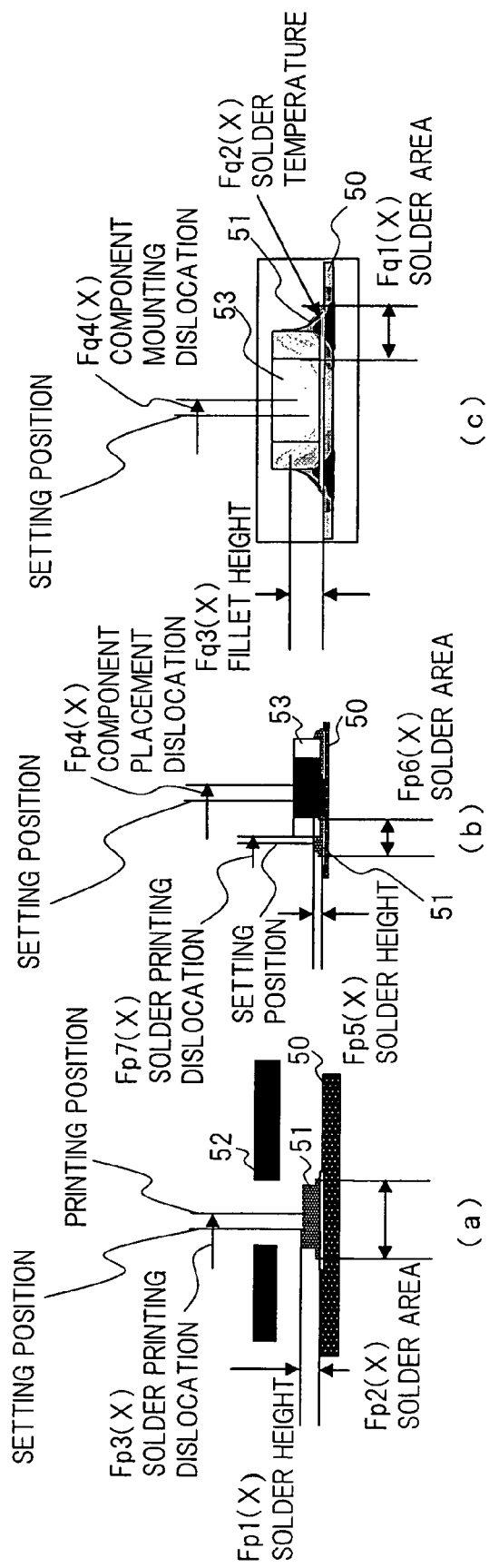
FIG. 6 is a view showing the meanings indicated by analysis results to be delivered to the next step and also showing the meanings indicated by mounting process performance values.

FIG. 6 is a view showing the meanings indicating the analysis results (the parameters Fp1(X) to Fp7(X)) to be delivered to the next step and also showing the meanings indicating the mounting process performance values (the parameters Fq1(X) to Fq4(X)). In FIG. 6, numeral 50 designates a circuit board, numeral 51 designates solder, numeral 52 designates a mask, and numeral 53 designates a component to be mounted on the circuit board. In FIG. 6, part (a) shows the state of the circuit board at the solder printing step, part (b) shows the state of the circuit board at the component placement step, and part (c) shows the state of the circuit board at the reflow step.

Part (a) of FIG. 6 shows Fp1(X): solder height, Fp2(X): solder area and Fp3(X): solder printing dislocation after solder printing. Part (b) of FIG. 6 shows Fp4(X): component placement dislocation, Fp5(X): solder height, Fp6(X): solder area and Fp7(X): solder printing dislocation after component placement. Part (c) of FIG. 6 shows Fq1(X): solder area, Fq2(X): solder temperature, Fq3(X): fillet height and Fq4(X): component mounting dislocation after reflow processing.

The solder areas Fp2(X), Fp6(X) and Fq1(X) are the areas of solder making contact with the circuit board, and they are indicated only in one direction in FIG. 6.

[Evaluation Section]

FIG. 7 is a table specifically showing examples of data to be stored in the experiment result DB 32 in the evaluation processing section 3.

In the mounting process simulation system in accordance with the first embodiment, by carrying out experiments using a plurality of facility parameters in advance, mounting process performance values, that is, solder area (Eq1(X)), solder temperature (Eq2(X)), fillet height (Eq3(X)) and component mounting dislocation (Eq4(X)) are obtained in advance. The contribution degrees of the respective mounting process performance values obtained by the results of the experiment with respect to reliability in consideration of the final service life of a solder joint portion are calculated. As a method to be used at this time to obtain the contribution degrees, the multivariate analysis method is available, for example.

In the mounting process simulation system in accordance with the first embodiment, the final service life of the solder joint portion is used as an evaluation item; however, for example, the measurement results of the shearing strength and resistance value of the joint portion can also be used as evaluation items.

To the mounting process evaluation section 31 of the evaluation processing section 3, the various mounting process performance values (Fq1(X) to Fq4(X) in FIG. 5), that is, data from the analysis result DB 24, are input, and the various mounting process performance values (Eq1(X) to Eq4(X) in FIG. 7), that is, data from the experiment result DB 32, are input. In the various mounting process performance values (Eq1(X) to Eq4(X)) to be input from the experiment result DB 32, their upper limit values (Ui), lower limit values (Li), ideal values (Oi) and contribution degrees (Wi) are included.

The mounting process evaluation section 31 calculates a normalized mounting process performance value Qi(X) by using the mounting process performance values (Fq1(X) to Fq4(X) in FIG. 5) from the analysis result DB 24 and by using the upper limit values (Ui), the lower limit values (Li), the ideal values (Oi) and the contribution degrees (Wi) of the respective mounting process performance values (Eq1(X) to Eq4(X)) from the experiment result DB 32. The normalized mounting process performance value Qi(X) is calculated by the following equation (2).

$$Qi(X)=|(Fqi(X))-(Oi)|/(Ui-Li)\times Wi \quad (2)$$

An explanation will be given below while specific numeric values are assigned to the equation (2). In the first embodiment, four mounting process performance values are available, and the respective mounting process performance values are normalized.

For example, in the case when the initial parameter for the solder area, serving as a mounting process performance value, corresponds to the combination Xa1, (Fqi(X)) from the analysis result DB 24 is 0.08, the ideal value (Oi) from the experiment result DB 32 is 0.09, the difference between the upper limit value and the lower limit value is (0.09–0.05), and the contribution degree (Wi) is 0.2. Hence, when the calculation of the equation (2) is carried out, the normalized mounting process performance value regarding the solder area is 0.05 when the initial parameter corresponds to the combination Xa1. Specific examples of the normalized mounting process performance values Qi(X) calculated as described above are shown in FIG. 8. In FIG. 8, as the normalized mounting process performance values, solder area is represented by Q1(X), solder temperature is represented by Q2(X), fillet height is represented by Q3(X), and component mounting dislocation is represented by Q4(X).

By using the normalized mounting process performance values calculated as described above, a common process performance value Q(X) in each of the initial parameter combinations (Xa1 to Xa10) is calculated. The common process performance value Q(X) is calculated by the following equation (3).

$$Q(X)=\Sigma Qi(X) \quad (3)$$

For example, in the case when the initial parameter corresponds to the combination Xa1, the common process performance value Q(X) becomes 0.597.

In the mounting process simulation system in accordance with the first embodiment, 0.4 is set as the target value of the common process performance value Q(X). Hence, the threshold value is set at 0.4, and the calculated common process performance value Q(X) is compared with the threshold value.

In the case when any common process performance values Q(X) do not become the threshold value or less as the result of the comparison between the calculated common process performance values Q(X) and the threshold value, the calculated common process performance values Q(X) are sent out to the optimizing section 4, and an approximate function is created.

[Optimizing Section]

FIGS. 9 and 10 are graphs explaining a method for creating an approximate function and a method for obtaining the minimum value from the approximate function, these methods being carried out in the optimizing section 4.

The optimizing section 4 comprises the approximate function creating section 41 and the numeric processing section 42; the approximate function creating section 41 creates an approximate function from a plurality of normalized common process performance values Q(X), and the numeric processing section 42 searches for the combination of facility parameters wherein the value becomes smallest in the approximate function.

The approximate function creating section 41 creates an approximate function R(X) in accordance with the response surface method using the normalized common process performance values Q(X) respectively corresponding to the plurality of initial parameter combinations (Xa1 to Xa10). In the first embodiment, the approximate function R(X) is a seven-dimensional function since seven facility parameters (Fp1(X) to Fp7(X)) are used as the analysis results in the respective simulations. However, in the following explanations, the approximate function R(X) is explained as a one-dimensional function to simplify explanations.

Part (a) of FIG. 9 is a curve showing an approximate function created by plotting the normalized common process performance values Q(X) regarding the ten initial parameter combinations (Xa1 to Xa10). The response surface method is used as the method for creating the approximate function. Part (b) of FIG. 9 shows searching for the minimum value from the curve of the created approximate function and also shows the case where the minimum value is the threshold value (0.4) or less. The method for searching for the minimum value in part (b) of FIG. 9 is SQP (Sequential Quadratic Programming). However, GA (Genetic Algorithms) and SA (Simulated Annealing) can also be used as searching methods.

The minimum value obtained from the approximate function is processed again as a tentative parameter Xb1 by the condition setting section 1, the analysis section 2 and the evaluation processing section 3, respectively, as described above, and the normalized common process performance value Q(X) regarding the tentative parameter is calculated. If the common process performance value Q(X) calculated herein is the threshold value or less, the mounting process simulations end. On the other hand, if the calculated common process performance value Q(X) has not yet reached the threshold value, a new approximate function is created again in the optimizing section 4.

FIG. 10 shows a method for creating a second approximate function and a method for obtaining the minimum value from the approximate function, these methods being carried out by the optimizing section 4.

Part (a) of FIG. 10 shows an approximate function created by plotting the normalized common process performance values Q(X) regarding the ten initial parameter combinations (Xa1 to Xa10) and one tentative parameter combination (Xb1) using a curve indicated by a solid line. In part (a) of FIG. 10, the curve indicated by a chain line is the approximate curve of the previous time shown in part (a) of FIG. 9. Hence, in the case of the curve of the approximate function of this time, the tentative parameter (Xb1) having been estimated and set in accordance with the approximate function of the previous time does not correspond to the facility parameter combination wherein the threshold value is reached.

Part (b) of FIG. 10 shows searching for the minimum value (Xb2) from the curve of the approximate function newly created this time. This minimum value (Xb2) is the threshold value (0.4) or less. At this time, in the case when the minimum value does not reach the threshold value (0.4), the mounting process simulations end because there is no solution.

As described above, in the mounting process simulation system in accordance with the first embodiment, an approximate function is created using a tentative parameter being calculated sequentially; this continues until its minimum value becomes the threshold value or less. As a result, optimum parameters are determined.

In the mounting process simulations in accordance with the first embodiment, the number of tentative parameter calculation times is set at 100.

FIG. 11 is a table describing specific numeric values obtained in the mounting process simulation system in accordance with the first embodiment. In this case, the common process performance value Q(X) became 0.395, less than the threshold value, in the 10th tentative parameter combination (Xb10). Hence, the setting parameters (x1 to x7, Fp1(X) to Fp7(X), Fq1(X) to Fq4(X)) at the time of this tentative parameter combination (Xb10) become optimum values.

As described above, as specifically explained in the embodiment, by means of the mounting process simulation system and the method thereof in accordance with the present invention, in the simulations of the mounting process including a plurality of steps, a single evaluation standard capable of making a comprehensive evaluation can be provided securely and easily.

In addition, according to the present invention, by sequentially carrying out the respective simulations, condition parameters for optimizing the mounting process performance of each step in the mounting process or the mounting process performance of the entire mounting process can be obtained easily and reliably.

Furthermore, in accordance with the present invention, it is possible to construct mounting process simulations wherein parameters being fixed or parameters being varied depending on the purpose of analysis can be set and changed easily. In the mounting process simulation system in accordance with the present invention, the simulations of the respective steps are analyzed sequentially, and the analysis results of the preceding step are stored in the data storage section of the preceding step and can be input as the condition parameters for the next step, whereby the entire performance in the mounting process comprising sequential steps can be analyzed.

Still further, in the mounting process simulation system in accordance with the present invention, the condition parameters being set gradually during the execution of the respective simulations and the analysis results based on the condition parameters can be stored so as to be related, whereby mounting process simulations that can be handled easily can be provided.

As described above, the mounting process simulation system in accordance with the present invention can provide a single evaluation standard capable of carrying out a comprehensive evaluation in a mounting process comprising a plurality of steps and is useful as a mounting process simulation system for reflow soldering processing in particular.

Although the present invention has been described with respect to its preferred embodiments in some detail, the disclosed contents of the preferred embodiments may change in the details of the structure thereof, and any changes in the combination and sequence of the components may be attained without departing from the scope and spirit of the claimed invention.

The invention claimed is:

1. A mounting process simulation system for a reflow soldering process in which a solder printing step, a component placement step and a reflow step are carried out, said mounting process simulation system comprising:
  a condition setting section for setting condition parameters for mounting process simulations,
  an analysis section for carrying out the respective simulations of said solder printing step, said component placement step and said reflow step on the basis of said condition parameters and for storing and outputting a plurality of analysis results showing different kinds of mounting process performance values calculated in the respective simulations,
  an evaluation processing section for creating a single evaluation value showing a common process performance value (Q(X)) by weighing and normalizing the plurality of analysis results of the different kinds of the mounting process performance values from said analysis section and for comparing the evaluation value with a preset target value, and
  an optimizing section for searching for a tentative parameter on the basis of said evaluation value and said plurality of analysis results from said analysis section at the time when said evaluation value does not reach the target value, and for outputting the tentative parameter to said condition setting section as condition parameters, wherein
  said evaluation processing section is configured such that said evaluation value is calculated by a mounting process performance value, wherein said mounting process performance value is calculated by using a first mounting process performance value and a second process performance value, wherein said first mounting process performance value is obtained from said analysis results of said respective simulations in said analysis section, and said second mounting process performance value is obtained from results of experiment which is conducted by using facility parameters in advance, and includes a contribution degree, and
  said second mounting process performance value (Eqi(X)) obtained by the experiment result has an upper limit value (Ui), a lower limit value (Li), an ideal value (Oi) and the contribution degree (Wi) of the respective step, and said mounting process performance value (Qi(X)) of the respective step is normalized by the following equation;

$$Qi(X) = |(Fqi(X)) - (Oi)| / (Ui - Li) \times Wi,$$

wherein Fqi(X) means said first mounting process performance value obtained by said analysis results of said respective simulations.

2. The mounting process simulation system in accordance with claim 1, wherein analysis results of said solder printing step simulation are used in said component placement step simulation, and analysis results of said component placement step simulation are used in said reflow step simulation.

3. The mounting process simulation system in accordance with claim 1, wherein said evaluation processing section determines said contribution degree, and said contribution degree is a contribution degree with respect to reliability of a solder joint portion.

4. The mounting process simulation system in accordance with claim 1, wherein said evaluation processing section creates said single evaluation value by normalizing said first and second mounting process performance values.

5. The mounting process simulation system in accordance with claim 1, wherein said different kinds of mounting process performance values include a performance value with respect to configuration.

6. The mounting process simulation system in accordance with claim 1, wherein the common process performance value (Q(X)) created by weighing and normalizing the analysis results of the different kinds of the mounting process performance values is calculated by multiplying each of the mounting process performance value by each of the contribution degrees obtained in the experiment, and by adding the multiplied values.

7. A mounting process simulation method for a reflow soldering process in which a solder printing step, a component placement step and a reflow step are carried out, said mounting process simulation method comprising:
  a step of setting condition parameters for mounting process simulations, a step of carrying out the respective simulations of said solder printing step, said component placement step and said reflow step on the basis of said condition parameters and of outputting the plurality of analysis results showing different kinds of mounting process performance values calculated in the respective simulations, a step of creating a single evaluation value showing a common process performance value (Q(X)) by weighing and normalizing said plurality of analysis results of the different kinds of the mounting process performance values from said carrying out and outputting step and of comparing the evaluation value with a preset target value, a step of searching for a tentative parameter on the basis of said evaluation value and said plurality of analysis results from said carrying out and outputting step at the time when said evaluation value does not reach the target value and of setting the tentative parameter as condition parameters, and a step of ending said mounting process simulations at the time when said evaluation value reaches the target value, wherein, in said step of comparing said evaluation value with said preset target value, said evaluation value is calculated by a normalized mounting process performance value, wherein said normalized mounting process performance value is calculated by using a first mounting process performance value and a second process performance value, wherein said first mounting process performance value is obtained from said analysis results of said respective simulations in said carrying out and outputting step, and said second mounting process performance value is obtained from results of experiment which is conducted by using facility parameters in advance, and includes a contribution degree, and said second mounting process performance value (Eqi(X)) obtained by the experiment result has an upper limit value (Ui), a lower limit value (Li), an ideal value (Oi) and the contribution degree (Wi) of the respective step, and said mounting process performance value (Qi(X)) of the respective step is normalized by the following equation;

$$Qi(X)=|(Fqi(X))-(Oi)|/(Ui-Li) \times Wi,$$

wherein Fqi(X) means said first mounting process performance value obtained by said analysis results of said respective simulations.

8. The mounting process simulation method in accordance with claim 7, wherein analysis results of said solder printing step simulation are used in said component placement step simulation, and analysis results of said component placement step simulation are used in said reflow step simulation.

9. The mounting process simulation method in accordance with claim 7, further comprising a step of determining said contribution degree, wherein said contribution degree is a contribution degree with respect to reliability of a solder joint portion.

10. The mounting process simulation method in accordance with claim 7, wherein said evaluation processing section creates said single evaluation value by normalizing said first and second mounting process performance values.

11. The mounting process simulation method in accordance with claim 7, wherein said different kinds of mounting process performance values include a performance value with respect to configuration.

12. The mounting process simulation method in accordance with claim 7, wherein the common process performance value (Q(X)) created by weighing and normalizing the analysis results of the different kinds of the mounting process performance values is calculated by multiplying each of the mounting process performance value by each of the contribution degrees obtained in the experiment, and by adding the multiplied values.

* * * * *